June 14, 1949.    L. ROGERS ET AL    2,473,450
VINE CUTTER
Filed July 31, 1944
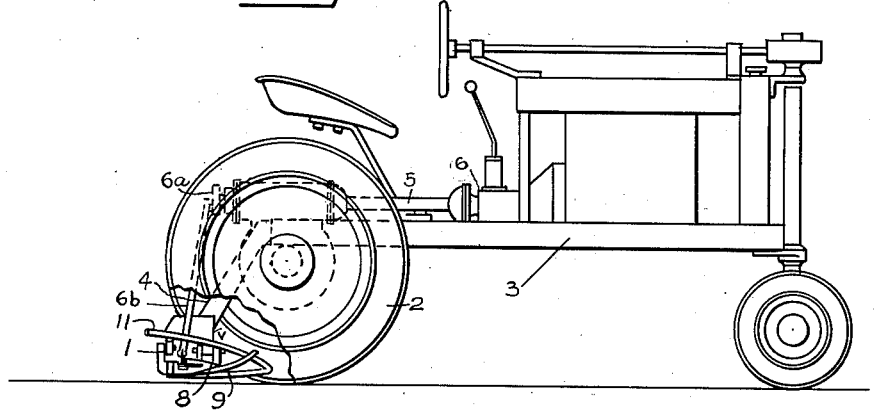
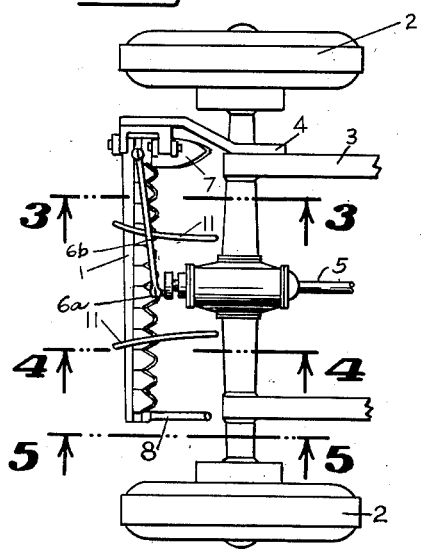
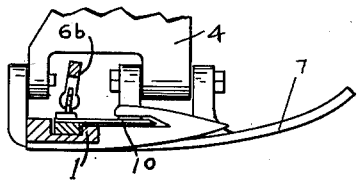
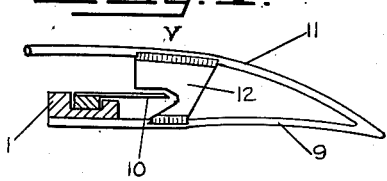
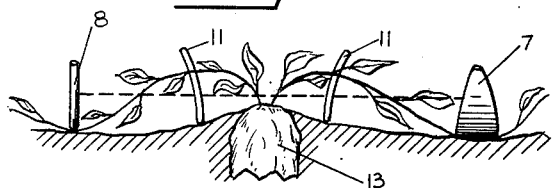
INVENTORS.
Louis Rogers
Clarence Rogers
By Harry Q. Schroeder
ATTORNEY.

Patented June 14, 1949

2,473,450

UNITED STATES PATENT OFFICE 2,473,450

VINE CUTTER

Louis Rogers and Clarence A. Rogers, Ripon, Calif.

Application July 31, 1944, Serial No. 547,388

2 Claims. (Cl. 55—107)

This invention relates to agricultural implements and particularly to one for cutting the vines of certain produce such as yams, in order to permit of the cultivation of the ground between the rows of yams.

The vines of the yams grow quite long and low and cover the ground between the rows. In order to cultivate the ground, the vines must be mainly removed, and as this has heretofore been mostly done by hand, a serious labor problem is presented.

It is therefore the main object of this invention to provide a vine cutting device, adapted to be attached to and operated by a tractor, by means of which the vines are efficiently cut through, so that they may be readily raked up and removed, leaving the ground exposed for cultivation.

Since the vines tend to lie close to the ground so that it is hard for a mower to operate on the same, it is a further object to provide, in connection with the mowing device, a means to lift the vines clear of the ground as the tractor advances, so as to dispose the vines in position for ready cutting.

Other objects of the invention are to obtain the above results with a minimum number of parts composing the structure, and to provide a structure that can be made small, compact, and light in weight. Still another object is to provide a structure that can be easily applied to almost any type of tractor and operated thereby.

Referring to the drawings:

Fig. 1 is a side elevation of a conventional tractor with the mowing machine in position.

Fig. 2 is a plan view of the rear of the tractor and the mowing machine.

Fig. 3 is a side elevation partly in section of one of the shoes for holding the vine in contact with the soil, the view taken substantially upon line 3—3 of Fig. 2.

Fig. 4 is a transverse sectional view on the line 4—4, Fig. 2, illustrating one of the members for lifting the vine in position to engage the cutting blades of the mowing machine.

Fig. 5 is a transverse section on the line 5—5, Fig. 2, illustrating one of the shoes for holding the vine in contact with the soil.

Fig. 6 is a pictorial illustration of the plant to be cultivated with the shoes and guides in position.

In detail, the device comprises a mower unit 1 of substantially conventional construction but considerably shorter than an ordinary mower, or so that it may lie entirely between the rear wheels 2 of a tractor 3. The mower unit 1 may be connected with the tractor frame in any desired manner, preferably by means of a bracket 4. The cutter bar 10 may be reciprocated in any conventional maner, by power derived from the tractor engine. For purposes of illustration and without intent to limit the invention in this particular, a drive shaft 5 is shown, receiving its power from the tractor transmission unit 6. The shaft 5 is provided with a crank 6a, which is operatively connected to the cutter bar by means of a pitman 6b, in a well-known manner.

The mower unit 1 is supported at one end by a ground shoe 7 which is so constructed with said unit as to slide on the ground and also on and over any vines which may lie in its path, as shown in Fig. 6. At the opposite end, the mower unit is provided with a shoe 8 of similar form longitudinally, but preferably narrower as shown; this shoe also riding the ground and passing over any vines in its path.

Mounted on the mower unit 1 at positions between the ground shoes 7 and 8 are vine lifters V. Each of these lifters, as clearly shown in Fig. 4, comprises a lower rod-like element 9 secured to and projecting forwardly from under the mower unit with a slight upward slope to a termination some distance ahead of the mower knives 10. A lifter rod 11 extends upwardly and rearwardly from the forward end of element 9 to a termination over and rearwardly of the mower unit; elements 9 and 11 being connected ahead of the knives by a brace 12 so that the upper element is held from sagging.

The lifting members V are suitably spaced apart so as to be disposed on opposite sides of the row of yams 13 being traversed by the tractor, and by reason of the specific form of said members as described, the vines are lifted, even when immediately adjacent to the ground, so as to dispose the stems of the vines, between the yams and said lifting members and between the latter and the hold-down shoes, in a position such that the following mower knives will cut through the stems.

The lower elements 9 of the lifting members being formed with a downward slope at the point, pass below ground level slightly and thus positively engage all vines, no matter how close to the ground they may be.

Having thus described our invention, what we claim as new and desire to secure by Letters Patent is:

1. A ground-trailing vine cutting device of the character described for attachment to a tractor, having in combination a mower unit provided with a reciprocative cutter blade, ground shoes secured to said unit at opposite ends thereof, so as to maintain said unit in a horizontal position, said shoes being so positioned as to engage and press downwardly upon such portions of trailing vines as may extend laterally into the paths of travel of said shoes, vine lifters secured to said mower unit beneath the blade thereof and having portions projecting in advance of the unit and between said ground shoes, said vine-lifters having ground-penetrating portions and means for lifting trailing vines into the cutting plane of the mower unit, and means for reciprocating said cutter blade.

2. A ground-trailing vine cutting device of the character described for attachment to a tractor, having in combination a mower unit provided with a reciprocative cutter blade, ground shoes secured to said unit beneath said blade at opposite ends thereof and supporting said unit in a horizontal position, vine lifting members secured to the mower unit beneath said blade and projected forwardly therefrom at positions between said ground shoes, each of said vine lifting members having a rod-like ground-penetrating member with an integral rod-like lifter extended upwardly and rearwardly over said blade from the forward end of said ground-penetrating member, means for bracing said lifter, and means for imparting reciprocative movements to said cutter bar.

LOUIS ROGERS.
CLARENCE A. ROGERS.

REFERENCES CITED

The following references are of record in the file of this patent:

UNITED STATES PATENTS

| Number | Name | Date |
|---|---|---|
| 747,314 | Brakeley | Dec. 15, 1903 |
| 1,974,346 | Seright | Sept. 18, 1934 |

FOREIGN PATENTS

| Number | Country | Date |
|---|---|---|
| 34,364 | Norway | Mar. 13, 1922 |
| 441,597 | Germany | Mar. 5, 1927 |